United States Patent
Zhou

(10) Patent No.: US 11,089,604 B2
(45) Date of Patent: Aug. 10, 2021

(54) COMMUNICATION RESOURCE MANAGEMENT METHOD AND DEVICE

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/579,698

(22) Filed: Sep. 23, 2019

(65) Prior Publication Data
US 2020/0022151 A1   Jan. 16, 2020

Related U.S. Application Data

(63) Continuation of application No. PCT/CN2017/078188, filed on Mar. 24, 2017.

(51) Int. Cl.
| | | |
|---|---|---|
| *H04W 72/08* | (2009.01) | |
| *H04W 76/27* | (2018.01) | |
| *H04L 1/18* | (2006.01) | |
| *H04L 5/00* | (2006.01) | |
| *H04W 8/24* | (2009.01) | |
| *H04W 72/04* | (2009.01) | |

(52) U.S. Cl.
CPC ......... *H04W 72/085* (2013.01); *H04L 1/1819* (2013.01); *H04L 5/0055* (2013.01); *H04W 8/24* (2013.01); *H04W 72/0413* (2013.01); *H04W 76/27* (2018.02)

(58) Field of Classification Search
CPC ........... H04W 72/085; H04W 72/0413; H04W 76/27; H04W 8/24; H04W 72/0493; H04L 1/1819; H04L 5/0055
See application file for complete search history.

(56) References Cited

U.S. PATENT DOCUMENTS

| | | | |
|---|---|---|---|
| 2015/0085803 A1* | 3/2015 | Hu ........................ | H04W 4/20 370/329 |
| 2016/0205540 A1* | 7/2016 | Wu ....................... | H04L 1/1812 370/329 |
| 2017/0230148 A1* | 8/2017 | Xu ........................... | H04L 5/14 |
| 2017/0288819 A1* | 10/2017 | Chen ................. | H04W 72/0466 |

(Continued)

FOREIGN PATENT DOCUMENTS

| CN | 102238739 A | 11/2011 |
|---|---|---|
| CN | 103096355 A | 5/2013 |

(Continued)

OTHER PUBLICATIONS

Byun et al. U.S. Appl. No. 62/417,323, filed Nov. 4, 2016 (Year: 2016).*

(Continued)

*Primary Examiner* — Wutchung Chu
(74) *Attorney, Agent, or Firm* — Syncoda LLC; Feng Ma

(57) ABSTRACT

A communication resource management method includes: transmitting, by a terminal, latency indication information of the terminal to an access network device, wherein the latency indication information is configured to indicate latency for processing a signal by the terminal; and managing, by the access network device, communication resources of the terminal according to the latency indication information.

20 Claims, 5 Drawing Sheets

(56) References Cited

U.S. PATENT DOCUMENTS

| | | | |
|---|---|---|---|
| 2018/0006787 A1* | 1/2018 | Chen | H04L 5/0051 |
| 2018/0124617 A1* | 5/2018 | Nagasaka | H04W 16/18 |
| 2019/0173651 A1* | 6/2019 | Zhang | H04L 1/1861 |
| 2019/0342864 A1* | 11/2019 | Hwang | H04L 5/0053 |
| 2020/0059949 A1* | 2/2020 | Byun | H04W 72/1284 |

FOREIGN PATENT DOCUMENTS

| | | |
|---|---|---|
| CN | 103313396 A | 9/2013 |
| CN | 104602355 A | 5/2015 |
| CN | 105634686 A | 6/2016 |
| CN | 105828445 A | 8/2016 |
| EP | 3043502 A1 | 7/2016 |
| EP | 3206320 A1 | 8/2017 |
| WO | 2009088496 A1 | 7/2009 |
| WO | 2009134100 A3 | 3/2010 |
| WO | 2016064010 A1 | 4/2016 |

OTHER PUBLICATIONS

Hwang et al. U.S. Appl. No. 62/454,005, filed Feb. 2, 2017 (Year: 2017).*

LG Electronics; Discussion on Hard timing and resource for NR; 3GPP Draft; R1-1700508 NR HARQ Timing RESOURCE_FINAL, 3RD Generation Partnership Project (3GPP), vol. RAN WG1, No. Spokane, USA; 20170116-20170120 Jan. 16, 2017 (Jan. 16, 2017), XP051208039.

International search report of PCT application No. PCT/CN2017/078188 dated Jun. 29, 2017.

First office action of Chinese application No. 201780000162.7 dated Sep. 27, 2019.

Extend European search report of counterpart EP application No. 17902162.1 dated Feb. 5, 2020.

* cited by examiner

COMMUNICATION RESOURCE MANAGEMENT METHOD AND DEVICE

CROSS-REFERENCE TO RELATED APPLICATIONS

This application is a continuation of, and claims priority to, International Application No. PCT/CN2017/078,188 filed on Mar. 24, 2017, the disclosure of which is hereby incorporated by reference in its entirety.

BACKGROUND

In radio communications, there is usually a time interval between the time that a terminal receives a signal from an antenna and the time that the terminal obtains content of the signal by decoding the signal. The time interval may be referred to as a processing latency for processing the signal by the terminal.

SUMMARY

The present disclosure relates to the field of radio communication technologies, and more specifically to a communication resource management method and device.

Various embodiments of the present disclosure provide a communication resource management method. The technical solutions are as follows.

According to a first aspect of the present disclosure, there is provided a communication resource management method. The method includes:

a terminal transmitting latency indication information of the terminal to an access network device, wherein the latency indication information is configured to indicate latency for processing a signal by the terminal; and managing communication resources of the terminal according to the latency indication information.

According to a second aspect of the present disclosure, there is provided a communication resource management method. The method includes:

receiving latency indication information of a terminal from the terminal, wherein the latency indication information is configured to indicate latency for processing a signal by the terminal; and managing communication resources of the terminal according to the latency indication information.

In some embodiments, the latency indication information comprises:

an upper limit value of a processing capability of the terminal or a lower limit value of the latency for processing the signal by the terminal, and/or a current processing capability value of the terminal, latency for currently processing the signal by the terminal or an offset between the latency for currently processing the signal by the terminal and the lower limit value of the latency for processing the signal by the terminal.

In some embodiments, receiving latency indication information of a terminal from the terminal comprises:

receiving the latency indication information reported by the terminal through a radio resource control (RRC) message; and/or receiving the latency indication information reported by the terminal through an uplink control signal.

In some embodiments, the RRC message is a UE capability information message.

In some embodiments, the uplink control signal is a control signal carried by a physical uplink control channel (PUCCH).

In some embodiments, managing communication resources of the terminal according to the latency indication information comprises:

reserving communication resources for the terminal according to the latency indication information.

In some embodiments, reserving communication resources for the terminal according to the latency indication information comprises:

reserving hybrid automatic repeat request (HARQ) resources for the terminal according to the latency indication information.

In some embodiments, reserving HARQ resources for the terminal according to the latency indication information comprises:

reserving, according to the latency indication information, uplink resources for the terminal for feeding back an acknowledgement/non-acknowledgement message; and the number of the uplink resources is inversely proportional to the latency indicated by the latency indication information.

In some embodiments, managing communication resources of the terminal according to the latency indication information includes:

scheduling, according to the latency indication information, uplink and downlink transmission resources for the terminal.

According to a third aspect of the present disclosure, there is provided a communication resource management method, including:

acquiring latency indication information of a terminal, wherein the latency indication information is configured to indicate latency for processing a signal by the terminal; and transmitting the latency indication information to an access network device, so that the access network device manages communication resources of the terminal according to the latency indication information.

In some embodiments, the latency indication information includes:

an upper limit value of a processing capability of the terminal or a lower limit value of the latency for processing the signal by the terminal, and/or a current processing capability value of the terminal, latency for currently processing the signal by the terminal, or an offset between the latency for currently processing the signal by the terminal and the lower limit value of the latency for processing the signal by the terminal.

According to a fourth aspect of the present disclosure, there is provided a communication resource management device, including:

an information acquisition module, configured to acquire latency indication information of a terminal, wherein the latency indication information is configured to indicate latency for processing a signal by the terminal; and an information reporting module, configured to transmit the latency indication information to an access network device, so that the access network device manages communication resources of the terminal according to the latency indication information.

In some embodiments, the information receiving module includes a first receiving sub-module and/or a second receiving sub-module;

the first receiving sub-module is configured to receive the latency indication information from the terminal by a radio resource control (RRC) message; and the second receiving sub-module is configured to receive the latency indication information from the terminal by an uplink control signal.

In some embodiments, the RRC message is a UE capability information message.

In some embodiments, the uplink control signal is a control signal carried by a physical uplink control channel (PUCCH).

In some embodiments, the management module includes:
a resource reservation sub-module, configured to reserve communication resources for the terminal according to the latency indication information.

In some embodiments, the resource reservation sub-module is configured to reserve hybrid automatic repeat request (HARQ) resources for the terminal according to the latency indication information.

In some embodiments, the resource reservation sub-module is further configured to reserve, according to the latency indication information, uplink resources for the terminal for feeding back an acknowledgement/non-acknowledgement message; and the resource amount of the uplink resources is inversely proportional to the latency indicated by the latency indication information.

In some embodiments, the management module includes:
a scheduling sub-module, configured to schedule, according to the latency indication information, uplink and downlink transmission resources used by the terminal.

According to a fifth aspect of the present disclosure, there is provided a communication resource management device. The device includes:
an information acquisition module, configured to acquire latency indication information of a terminal, wherein the latency indication information is used to indicate latency for processing a signal by the terminal; and
an information reporting module, configured to report the latency indication information to an access network device, so that the access network device manages communication resources of the terminal according to the latency indication information.

In some embodiments, the information reporting module includes: a first reporting sub-model and/or a second reporting sub-model;
the first reporting sub-module, configured to transmit the latency indication information to the access network device by a radio resource control (RRC) message; and
the second reporting sub-module, configured to transmit the latency indication information to the access network device by an uplink control signal.

According to a sixth aspect of the present disclosure, there is provided a communication resource management system. The system includes an access network device and a terminal.

The access network device includes the communication resource management device shown in the fourth aspect or any optional implementation mode of the fourth aspect.

The terminal includes the communication resource management device shown in the fifth aspect or any optional implementation mode of the fifth aspect.

According to a seventh aspect of the present disclosure, there is provided a communication resource management device, communication resource management device, including:
a processor; and
a memory for storing a processor-executable instruction, wherein
the processor is configured to:
receive latency indication information of a terminal from the terminal, wherein the latency indication information is configured to indicate latency for processing a signal by the terminal; and
manage communication resources of the terminal according to the latency indication information.

According to an eighth aspect of the present disclosure, there is provided a communication resource management device, communication resource management device, including:
a processor; and
a memory for storing a processor-executable instruction, wherein
the processor is configured to:
acquire latency indication information of a terminal, wherein the latency indication information is configured to indicate latency for processing a signal by the terminal; and
transmit the latency indication information to an access network device, so that the access network device manages communication resources of the terminal according to the latency indication information.

It is to be understood that both the foregoing general description and the following detailed description are examples and are not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
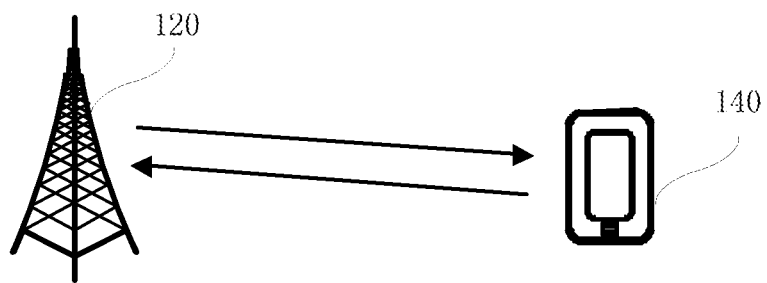
FIG. 1 is a structural diagram of a mobile communication system according to some embodiments t of the present disclosure.

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of devices and methods consistent with aspects related to the invention/disclosure as recited in the appended claims.

It should be understood that "a plurality" as referred to herein means one or more, "many" as referred to herein means two or more. "And/or" describes an association relationship between associated objects and indicates that there may be three relationships. For example, A and/or B may indicate that there are three cases where A exists separately, A and B exist at the same time, and B exists separately. The character "/" generally indicates that an "or" relationship exists between contextual objects.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the drawings. For example, two functions or acts shown in succession may in fact be executed concurrently or may sometimes be executed in the reverse order, depending upon the functionality/acts involved.

A "module" mentioned herein can refer to a program or instruction stored in a memory that can achieve a certain function. A "unit" mentioned herein can refer to a functional structure partitioned logically, and this "unit" can be implemented by hardware alone or by a combination of software and hardware.

The various device components, units, blocks, or portions may have modular configurations, or are composed of discrete components, but nonetheless may be referred to as "modules" in general. In other words, the "modules" referred to herein may or may not be in modular forms.

The processing latency for processing the signal is one of factors that should be considered when an access network device manages radio communication resources of the terminal. In a long-term evolution (LTE) system, each terminal has the processing latency of 4 subframes by default, i.e., 4 ms. That is, for all terminals access to the access network device, the access network device manages radio resources of each terminal according to the processing latency of 4 subframes.

FIG. 1 is a structural diagram of a mobile communication system shown according to some examples of the present disclosure. This mobile communication system can be a 5G (the 5th generation mobile communication) system, also called an NR (new radio) system. The mobile communication system includes an access network device 120 and a terminal 140.

The access network device 120 can be a base station. For example, the base station can be a base station (gNB) that adopts centralized and distributed architecture in the 5G system. When adopting the centralized and distributed architecture, the access network device 120 generally includes a central unit (CU) and at least two distributed units (DU). A protocol stack includes a packet data convergence protocol (PDCP) layer, a radio link control (RLC) layer and a media access control (MAC) layer is set in the central unit, a physical (PHY) layer protocol stack is set in the distributed unit, and the specific implementation mode of the access network device 120 is not limited in examples of the present disclosure.

The access network device 120 establishes a radio connection with the terminal 140 through a radio air interface. In some embodiments, the radio air interface is a radio air interface based on a 5G standard. For example, the radio air interface is a new radio (NR) air interface.

Alternatively, the radio air interface can also be a radio air interface based on a next generation mobile communication network technology standard of 5G.

The terminal 140 can be a device that provides voice and/or data connectivity for users. The terminal, also called user equipment (UE), can communicate with one or more core networks via a radio access network (RAN). The terminal 140 can be a mobile terminal, such as a mobile phone (or referred to as a "cell" phone), and a computer having a mobile terminal, which for example can be a portable, pocket-sized, handheld, computer-embedded, or vehicle-mounted mobile device, such as a subscriber unit, a subscriber station, a mobile station, a mobile platform, a remote station, an access point, a remote terminal, an access terminal, a user terminal, a user agent, a user device or user equipment.

It should be noted that the mobile communication system shown in FIG. 1 can include a plurality of access network devices 120 and/or a plurality of terminals 140. FIG. 1 illustrates the mobile communication system including one access network devices 120 and one terminal 140. This is not limited in the embodiment of the present disclosure.

The current service types of the 5G system include eMBB (enhanced mobile broad band), mMTC (massive machine type communication), URLLC (ultra-reliable low-latency communication) and the like, and there can be more segmentation types in the future. All those services belong to data services, but have different requirements on latency and reliability. For example, the URLLC service can be applied to scenarios, for example, the Internet of vehicles, which request low latency and high timeliness and can be pre-emption for prior services. The mMTC service generally is insensitive to latency and can deliver data after a long-time interval.

In order to meet demands of low-latency of the URLLC service and the like, the terminal is required to reduce the processing latency for processing a signal. In the 5G system, the processing latency of the terminal is affected by many factors, such as the process capability of a baseband processor, the power consumption condition of the terminal, the cost of the terminal, and a specific form of the terminal (a mobile phone, a wearable device, an Internet-of-things device, MiFi and other dedicated devices). Therefore, the processing latency of different terminals for the signal can be different, and even if it is the same terminal, the processing latency thereof for the signal can be different under different working states. For example, in the LTE system, the processing latency of the terminal is T+4 (ms), while in the 5G system, some terminals can achieve the processing latency of T+3 (ms), and some terminals with higher capability can achieve the processing latency of T+2 (ms), T+1 (ms) and even T+0 (ms).

Alternatively, certain terminal can achieve the processing latency of T+2 (ms) in a high-power state and can restore to the processing latency of T+4 (ms) under a lower-power state.

To meet the demands of managing the communication resources of the terminal according to the different processing latencies in the 5G system, examples of the present disclosure provides a communication resource management solution. That is, the access network device manages communication resources of different terminals according to the processing latencies of the terminals. For example, the access network device reserves or schedules resources for a terminal according to the processing latency of the terminal. The details are shown in the following examples.

Figure 2:
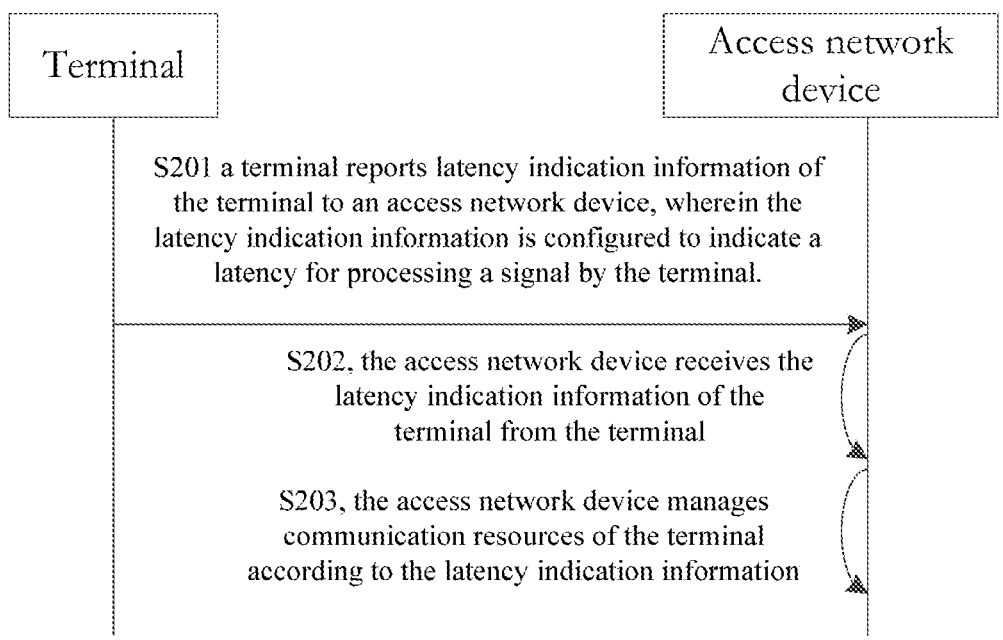
FIG. 2 is a flowchart of a communication resource management method according to some embodiments of the present disclosure.

FIG. 2 is a flowchart of a communication resource management method shown according to some examples. As shown in FIG. 2, the communication resource management method is applied to the implementation environment shown in FIG. 1 and can include the following steps.

In step 201, a terminal reports latency indication information of the terminal to an access network device, wherein the latency indication information is configured to indicate latency for processing a signal by the terminal.

In step 202, the access network device receives the latency indication information of the terminal from the terminal.

In step 203, the access network device manages communication resources of the terminal according to the latency indication information.

In some embodiments, the latency indication information includes: a upper limit value of a processing capability of the terminal or a lower limit value of the processing latency for processing the signal by the terminal, and/or a current processing capability value of the terminal, a processing latency for processing the signal by the terminal, or an offset between the latency for currently processing the signal by the terminal and the lower limit value of the latency for processing the signal by the terminal.

In some embodiments, the access network device receives the latency indication information of the terminal from the terminal, including:

the access network device receives the latency indication information from the terminal through a radio resource control (RRC) message; and/or the access network device receives the latency indication information from the terminal through an uplink control signal.

In some embodiments, the RRC message is a UE capability information message.

In some embodiments, the uplink control signal is control signal carried by a physical uplink control channel (PUCCH).

In some embodiments, the access network device manages communication resources of the terminal according to the latency indication information, including: the access network device reserves communication resources for the terminal according to the latency indication information.

In some embodiments, the access network device reserves communication resources for the terminal according to the latency indication information includes: the access network device reserves hybrid automatic repeat request (HARQ) resources for the terminal according to the latency indication information.

In some embodiments, the access network device reserves HARQ resources for the terminal according to the latency indication information includes: the access network device reserves, according to the latency indication information, uplink resources for the terminal for feeding back an acknowledgement/non-acknowledgement message; and the number of the uplink resources is inversely proportional to the latency indicated by the latency indication information.

In some embodiments, the access network device manages communication resources of the terminal according to the latency indication information includes: the access network device schedules, according to the latency indication information, uplink and downlink transmission resources for the terminal.

Therefore, for the communication resource management method shown in some examples of the present disclosure, since the terminal reports its latency indication information to the access network device, and the access network device manages communication resources of the terminal according to the latency indication information, so as to the purpose of managing the communication resources of the terminal according to different processing latencies is achieved.

Figure 3:
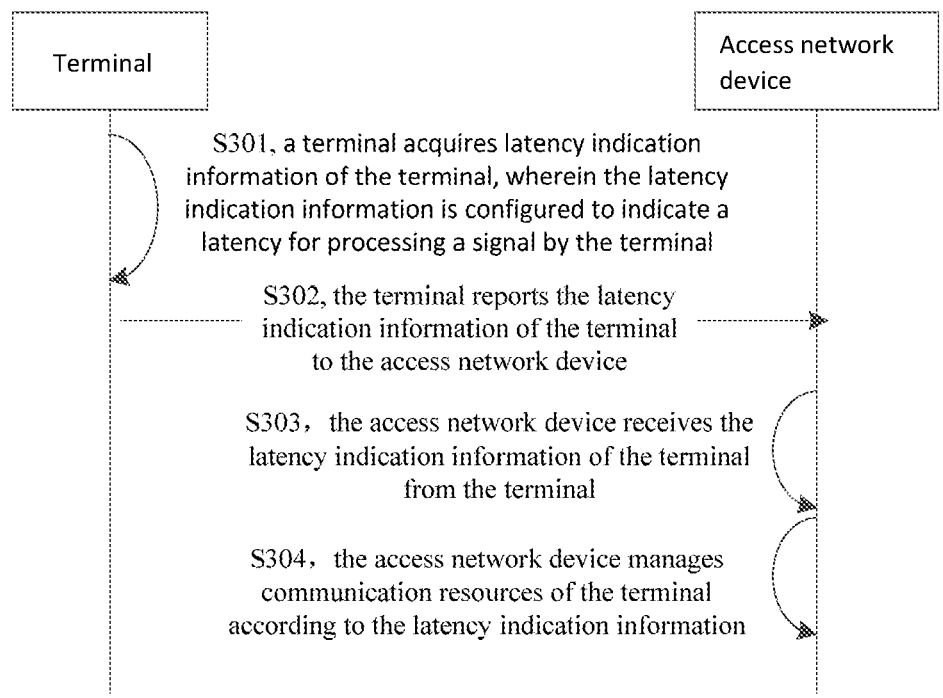
FIG. 3 is a flowchart of a communication resource management method according to some embodiments of the present disclosure.

FIG. 3 is a flowchart of a communication resource management method according to some embodiments of the present disclosure. As shown in FIG. 3, the communication resource management method is applied to the implementation environment shown in FIG. 1 and can include the following steps.

In step 301, a terminal acquires latency indication information of the terminal, wherein the latency indication information is configured to indicate latency for processing a signal by the terminal.

In examples of the present disclosure, the latency for processing the signal by the terminal is mainly latency for receiving and demodulating data by a baseband processor of the terminal.

In some embodiments, the latency indication information includes: a upper limit value of a processing capability of the terminal or a lower limit value of the processing latency for processing the signal by the terminal, and/or a current processing capability value of the terminal, a processing latency for processing the signal by the terminal, or an offset between the latency for currently processing the signal by the terminal and the lower limit value of the latency for processing the signal by the terminal.

In examples of the present disclosure, the processing capability value of the terminal can be defined by a new UE capability category information of a radio communication system, and different processing capability values correspond to different processing latencies (in some literatures or materials, the processing latency is also known as a scheduling granularity). For example, table 1 shows a corresponding relationship related to examples of the present disclosure between the processing capability value and the processing latency.

TABLE 1

| Processing Capability Value | Processing Latency t |
|---|---|
| 1 | $t_1$ |
| 2 | $t_2$ |
| 3 | $t_3$ |
| 4 | $t_4$ |

As shown in table 1, processing capability values of the terminal are divided into four levels, i.e., level 1, level 2, level 3 and level 4. The terminal having the processing capability value of 1 has the processing latency of $t_1$ for processing the signal, and accordingly the terminal having the processing capability value of 2 has the processing latency of $t_2$ for processing the signal, and so on.

When the terminal acquires the latency indication information, the terminal can directly acquire the lower limit value of the latency for processing the signal by the terminal (i.e., the lowest latency for processing the signal by the terminal). For example, if the lowest latency for processing the signal by the terminal is $t_2$, the latency indication information acquired by the terminal is $t_2$.

Alternatively, when the terminal acquires the latency indication information, the terminal can also acquire the lower limit value of the latency for processing the signal by the terminal, and searches for a corresponding processing capability value according to the lower limit value of the latency, then determines the corresponding processing capability value as the upper limit value of the processing capability of terminal. And the terminal determines the upper limit value of the processing capability as the latency indication information.

In addition, some terminals have a variable processing latency for processing a signal. For example, the same terminal can have different processing latencies for processing the signal in high power situation and in lower power situation. Therefore, in the manner shown in examples of the present disclosure, the latency indication information can be the current processing capability value of the terminal, the processing latency for processing the signal by the terminal, or an offset between the latency for currently processing the signal by the terminal and the lower limit value of the latency for processing the signal by the terminal.

For example, when the terminal acquires the latency indication information, the terminal can directly acquire the latency for currently processing the signal by the terminal. For example, if the latency for currently processing the signal by the terminal is $t_2$, the latency indication information acquired by the terminal is $t_2$.

Alternatively, when the terminal acquires the latency indication information, the terminal can also acquire the latency for currently processing the signal by the terminal, and searches for a corresponding processing capability value according to the latency. The corresponding processing capability value is the current processing capability value of the terminal, and the terminal determines the current processing capability value as the latency indication information.

Alternatively, in another implementation, the terminal can also acquire the lower limit value of the latency for processing the signal by the terminal and the latency for currently processing the signal by the terminal, and determines the offset between the latency for currently processing the signal by the terminal and the lower limit value of the latency for processing the signal by the terminal as the latency indication information.

The latency indication information acquired by the terminal may only indicate the lower limit value of the processing latency of the terminal, that is, the latency indication information includes the upper limit value of the processing capability of the terminal or the lower limit value of the latency for processing the signal by the terminal.

Alternatively, the latency indication information acquired by the terminal may only indicate the current processing latency of the terminal, that is, the latency indication information includes the current processing capability value of the terminal, the latency for currently processing the signal by the terminal, or the offset between the latency for currently processing the signal by the terminal and the lower limit value of the latency for processing the signal by the terminal.

Alternatively, the latency indication information acquired by the terminal may simultaneously indicate the lowest processing latency and the current processing latency of the terminal, that is, the latency indication information contains the upper limit value of the processing capability of the terminal or the lower limit value of the latency for processing the signal by the terminal, the current processing capability value of the terminal, the latency for currently processing the signal by the terminal, or the offset between the latency for currently processing the signal by the terminal and the lower limit value of the latency for processing the signal by the terminal.

In step 302, the terminal reports the latency indication information of the terminal to the access network device.

In some embodiments, the terminal can report the latency indication information to the access network device through a radio resource control (RRC) message; and/or report the latency indication information to the access network device through an uplink control signal.

In some implementations, the terminal can report the latency e indication information to the access network device through the RRC message in a network attachment procedure. For example, in the network attachment procedure, the terminal can report, through the RRC message, to the access network device, the upper limit value of the processing capability of the terminal or the lower limit value of the latency for processing the signal by the terminal. Of course, the terminal can report the latency indication information to the access network device by the RRC message, such as the current processing capability value of the terminal, the latency for currently processing the signal by the terminal or the offset between the latency for currently processing the signal by the terminal and the lower limit value of the latency for processing the signal by the terminal.

In some embodiments, the RRC message is a UE capability information message.

There can be many different types of RRC messages sent to the access network device by the terminal. In examples of the present disclosure, the terminal can report the latency indication information to the access network device through the UE capability information message in the RRC messages. For example, the terminal can add a new field to the release field of the UE capability information message. For example, the newly-added field can be named a UE process time field, and is configured to carry the latency indication information mentioned above.

In another implementation, after completion of connection establishment with the access network device, the terminal can report the latency indication information to the access network device through the uplink control signal. For example, after completion of the connection establishment, the terminal can report, through the uplink control signal, to the access network device, the latency indication information, such as the current processing capability value of the terminal, the latency for currently processing the signal by the terminal, or the offset between the latency for currently processing the signal by the terminal and the lower limit value of the latency for processing the signal by the terminal. Of course, the terminal can also report the upper limit value of the processing capability of the terminal or the lower limit value of the latency for processing the signal through the uplink control signal.

In some embodiments, the uplink control signal is a control signal carried in a physical uplink control channel (PUCCH).

In step 303, the access network device receives the latency indication information of the terminal from the terminal.

Accordingly, the access network device can receive the latency indication information reported by the terminal through the RRC message; and/or receive the latency indication information reported by the terminal through the uplink control signal.

In step 304, the access network device manages communication resources of the terminal according to the latency indication information.

In some examples of the present disclosure, the access network device can reserve communication resources for the terminal according to the latency indication information.

In some embodiments, when the access network device reserves communication resources for the terminal according to the latency indication information, the access network device can reserve hybrid automatic repeat request (HARQ) resources for the terminal according to the latency indication information. For example, the access network device can reserve, according to the latency indication information, uplink resources for the terminal for feeding back an acknowledgement/non-acknowledgement (ACK/NACK) message; and the number of the uplink resources is inversely proportional to the latency indicated by the latency indication information.

Figure 4:
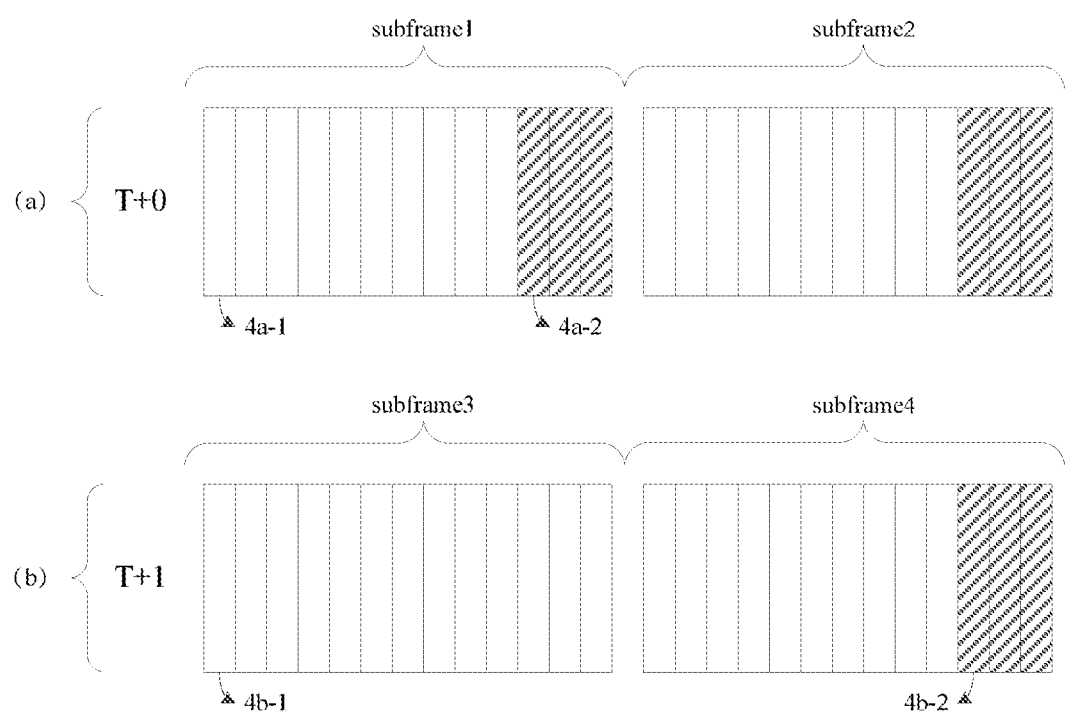
FIG. 4 is a diagram of resource reservation involved in examples shown in FIG. 3.

FIG. 4 shows a diagram of resource reservation involved in examples of the present disclosure. FIG. 4 indicates a comparison between relations of each resource reservation condition and the corresponding latency indication information, by taking reservation of ACK/NACK resources for the terminal according to the latency indication information as an example. It is assumed that one subframe includes 13 time-domain resource units that can be used for uplink and downlink data transmission. Each rectangular grid in FIG. 4 represents one time-domain resource unit, for example, an orthogonal frequency division multiplexing (OFDM) symbol.

In part (a) of FIG. 4, T+0 represents that the latency indication information of the terminal indicates that the lower limit value of the processing latency or the current processing latency of the terminal is within a time range of one subframe (that is, 1 ms). That is, for the downlink data sent to the terminal in one subframe, the terminal can finish the processing and feed back the ACK/NACK message within the current subframe. At this time, the access network device can reserve, for the terminal, uplink resources in each subframe for feeding back the ACK/NACK message. For example, as shown in part (a) of FIG. 4, the access network device reserves the first 10 time-domain resource units of the 13 time-domain resource units, which can be used for uplink and downlink data transmission in each of subframe 1 and subframe 2, as the downlink time-domain resource units corresponding to the terminal, and reserves the last 3 time-domain resource units as the uplink time-domain resource units for the terminal.

In part (b) of FIG. 4, T+1 represents that the latency indication information of the terminal indicates that the lower limit value of the processing latency or the current processing latency of the terminal is within a time range between one subframe and two subframe, (that is, 1 ms~2 ms). That is, for the downlink data sent to the terminal in one subframe, the terminal can complete the processing and feed back the ACK/NACK message within a subframe next to the current subframe. At this time, the access network device can reserve uplink resources for feeding back the ACK/NACK message every other subframe. For example, as shown in part (b) of FIG. 4, for two continues subframes (subframe 3 and subframe 4), the access network device reserves all 13 time-domain resource units in subframe 3 and the first 10 time-domain resource units in subframe 4, which can be used for uplink and downlink data transmission, as the downlink time-domain resource units for the terminal, and reserves the last 3 time-domain resource units in subframe 4 as the uplink time-domain resource units for the terminal.

In some embodiments, the access network device can schedule, according to the latency indication information, uplink and downlink transmission resources for the terminal.

For example, referring to FIG. 4, for the terminal having the processing latency corresponding to T+0, when access network device sends data to the terminal, the access network device can instruct the terminal to receive the data from the access network device on the first time-domain resource unit (that is, the time-domain resource unit 4a-1 in FIG. 4) in subframe 1 shown in FIG. 4, and instruct the terminal to report the ACK/NACK message, for the data received on the time domain resource unit 4a-1, on the eleventh time-domain resource unit (that is, the time-domain resource unit 4a-2 in FIG. 4). Accordingly, for the terminal having the processing latency corresponding to T+1, when the access network device sends data to the terminal, the access network device can instruct the terminal to receive the data from the access network device on the first time-domain resource unit (i.e., the time-domain resource unit 4b-1 in FIG. 4) in subframe 3 shown in FIG. 4, and instruct the terminal to report the ACK/NACK message on the eleventh time-domain resource unit (that is, the time-domain resource unit 4b-2 in FIG. 4) for the data received on the time domain resource unit 4b-1.

It should be noted that in the examples shown in FIG. 4, the uplink and downlink time-domain resource units reserved for the terminal by the access network device can be specific time-domain resource units for the terminal.

Alternatively, the uplink and downlink time-domain resource units reserved for the terminal by the access network device can be time-frequency resource units shared by the terminal and other terminals, that is, in the uplink and downlink time-frequency resource units, if the terminal is not scheduled to occupy these time-domain resource units, the access network device can instruct, by a scheduling message, other terminals to occupy the above time-domain resource units.

Therefore, for the communication resource management method shown in examples of the present disclosure, since the terminal reports its latency indication information to the access network device, and the access network device manages, for example, reserves or schedules communication resources of the terminal according to the processing latency of the terminal to the signal which is indicated by the latency indication information, the purpose of managing the communication resources of the terminal according to different processing latencies can be achieved.

The following is examples of devices, which can be adopted to implement some examples of methods of the present disclosure. For the details not disclosed in the examples of the devices of the present disclosure, reference can be made to the examples of methods of the present disclosure.

Figure 5:
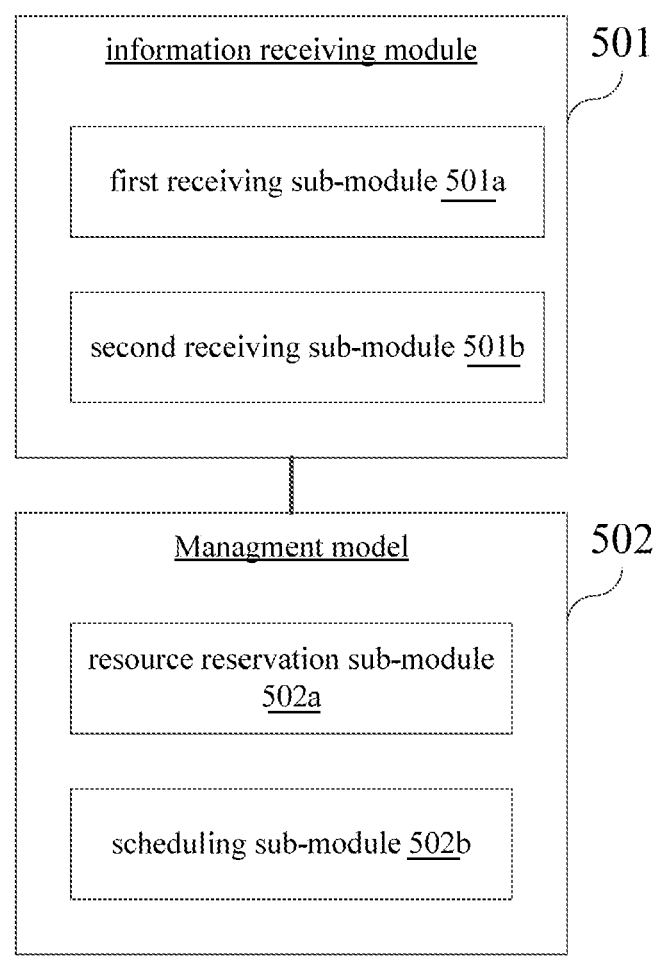
FIG. 5 is a block diagram of a communication resource management device according to some embodiments.

FIG. 5 is a block diagram of a communication resource management device shown according to some examples of the present disclosure. As shown in FIG. 5, this communication resource management device can be implemented as all or part of the access network device in the implementation environment shown in FIG. 1 by hardware or a combination of software and hardware. The communication resource management device can include:

an information receiving module 501, configured to receive latency indication information of a terminal reported by the terminal, wherein the latency indication information is configured to indicate latency for processing a signal by the terminal; and a management module 502, configured to manage communication resources of the terminal according to the latency indication information.

In some embodiments, the latency indication information includes:

an upper limit value of a processing capability of the terminal or a lower limit value of the latency for processing the signal by the terminal, and/or a current processing capability value of the terminal, the latency for currently processing the signal by the terminal, or an offset between the latency for currently processing the signal by the terminal and the lower limit value of the latency for processing the signal by the terminal.

In some embodiments, the information receiving module 501 includes a first receiving sub-module 501a and/or a second receiving sub-module 501b.

The first receiving sub-module 501a is configured to receive the latency indication information from the terminal by a radio resource control (RRC) message; and the second receiving sub-module 501b is configured to receive the latency indication information from the terminal by an uplink control signal.

In some embodiments, the RRC message is a UE capability information message.

In some embodiments, the uplink control signal is a control signal carried by a physical uplink control channel (PUCCH).

In some embodiments, the management module 502 includes:

a resource reservation sub-module 502a for reserving communication resources for the terminal according to the latency indication information.

In some embodiments, the resource reservation sub-module 502a is configured to reserve hybrid automatic repeat request (HARQ) resources for the terminal according to the latency indication information.

In some embodiments, the resource reservation sub-module 502a is specifically configured to reserve, according to the latency indication information, uplink resources for the terminal for feeding back an acknowledgement/non-acknowledgement message; and the number of the uplink resources is inversely proportional to the latency indicated by the latency indication information.

In some embodiments, the management module 502 includes: a scheduling sub-module 502b for scheduling, according to the latency indication information, uplink and downlink transmission resources for the terminal.

Therefore, for the communication resource management device shown in examples of the present disclosure, since the terminal reports its latency indication information to the access network device, and the access network device manages, for example, reserves or schedules communication resources of the terminal according to the processing latency of the terminal to the signal which is indicated by the latency indication information, the purpose of managing the communication resources of the terminal according to different processing latencies is achieved.

Figure 6:
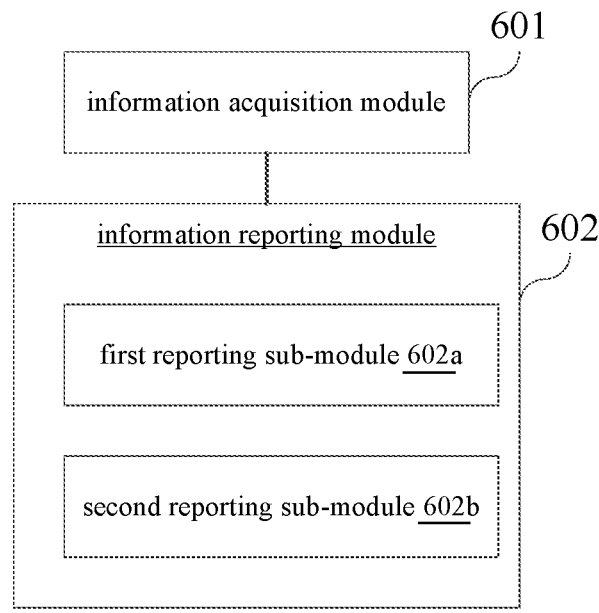
FIG. 6 is a block diagram of a communication resource management device according to some embodiments.

FIG. 6 is a block diagram of a communication resource management device shown according to some examples. As shown in FIG. 6, this communication resource management device can be implemented as all or part of the terminal in the implementation environment shown in FIG. 1 through hardware or a combination of software and hardware. The communication resource management device can include:

an information acquisition module 601 for acquiring latency indication information of a terminal, wherein the latency indication information is used to indicate latency for processing a signal by the terminal; and an information reporting module 602 for reporting the latency indication information to an access network device, so that the access network device manages communication resources of the terminal according to the latency indication information.

In some embodiments, the information reporting module 602 includes a first reporting sub-module 602a and/or a second reporting sub-module 602b.

The first reporting sub-module 602a is configured to report the latency indication information to the access network device by a radio resource control (RRC) message; and the second reporting sub-module 602b is configured to report the latency indication information to the access network device by an uplink control signal.

Therefore, for the communication resource management device shown in the embodiments of the present disclosure, since the terminal reports its latency indication information to the access network device and the access network device manages communication resources of the terminal according to the processing latency of the terminal to the signal which is indicated by the latency indication information, the purpose of managing the communication resources of the terminal according to different processing latencies is achieved.

Examples of the present disclosure also provide a communication resource management system. The system includes an access network device and at least one terminal.

The access network device includes the communication resource management device as shown in FIG. 5.

The terminal includes the communication resource management device as shown in FIG. 6.

It should be noted that when implementing its function, the device provided in the above examples is only illustrated by dividing the same into various functional modules. In practical application, the above functions can be assigned to be completed by different functional modules according to actual needs, that is, the content structure of the device is divided into different functional modules to complete all or part of the functions described above.

For the device in the above examples, the specific mode of each module for executing operations has been described in details in the embodiment of the related method and is not further described in detail herein.

Examples of the present disclosure provides a communication resource management device capable of implementing the communication resource management method executed by the access network device in FIG. 2 or FIG. 3 of the present disclosure. The communication resource management device includes a processor and a memory for storing a processor-executable instruction.

The processor is configured to:

receive latency indication information of a terminal from the terminal, wherein the latency indication information is configured to indicate latency for processing a signal by the terminal; and manage communication resources of the terminal according to the latency indication information.

In some embodiments, the latency indication information includes: an upper limit value of a processing capability of the terminal or a lower limit value of the latency for processing the signal by the terminal; and/or a current processing capability value of the terminal, latency for currently processing the signal by the terminal or an offset between the latency for currently processing the signal by the terminal and the lower limit value of the latency for processing the signal by the terminal.

In some embodiments, the receive the latency indication information of the terminal reported by the terminal, including:

receive the latency indication information from the terminal by a radio resource control (RRC) message; and/or receive the latency indication information from the terminal by an uplink control signal.

In some embodiments, the RRC message is a UE capability information message.

In some embodiments, the uplink control signal is control signal carried in a physical uplink control channel (PUCCH).

In some embodiments, the manage communication resources of the terminal according to the latency indication information, including: reserve communication resources for the terminal according to the latency indication information.

In some embodiments, the reserve communication resources for the terminal according to the latency indication information, including:

reserve hybrid automatic repeat request (HARQ) resources for the terminal according to the latency indication information.

In some embodiments, the reserve hybrid automatic repeat request (HARQ) resources for the terminal according to the latency indication information, including: reserve, according to the latency indication information, uplink resources for the terminal for feeding back an acknowledgement/non-acknowledgement message, wherein the number of the uplink resources is inversely proportional to the latency indicated by the latency indication information.

In some embodiments, the manage communication resources of the terminal according to the latency indication information, including: schedule, according to the latency indication information, uplink and downlink transmission resources for the terminal.

Examples of the present disclosure provide a communication resource management device capable of implementing the communication resource management method executed by the terminal in FIG. 2 or FIG. 3 of the present disclosure. The communication resource management device includes a processor and a memory for storing a processor-executable instruction.

The processor is configured to:

acquire latency indication information of a terminal, wherein the latency indication information is configured to indicate latency for processing a signal by the terminal; and transmit the latency indication information to an access network device, so that the access network device manages communication resources of the terminal according to the latency indication information.

In some embodiments, the report the latency indication information to an access network device, including:

transmit the latency indication information to the access network device by a radio resource control (RRC) message; and/or transmit the latency indication information to the access network device by an uplink control signal.

The solution provided in some examples of the present disclosure is mainly described by taking the communication resource management device as an example. It may be understood that for implementing the above functions, the communication resource management device includes corresponding hardware structures and/or software modules for executing various functions. Various modules and algorithm steps described in conjunction with the examples disclosed in the present disclosure may be implemented as hardware or a combination of hardware and computer software. Whether certain function is implemented in the manner of hardware or in the manner that computer software drives the hardware depends on particular applications and design constraints of the technical solutions. A person skilled in the art may implement the described functions with different methods for each of particular applications, but such implementation shall not be regarded as going beyond the scope of the technical solution of the embodiment of the present disclosure.

Figure 7:
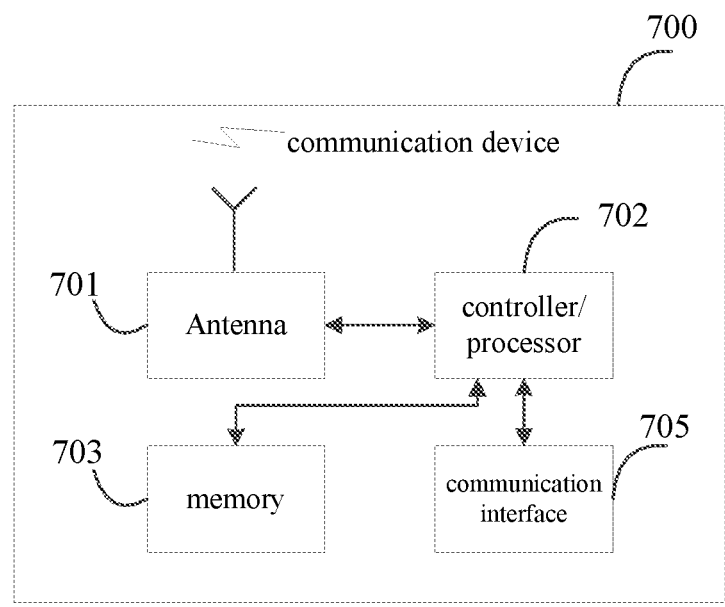
FIG. 7 is a block diagram of a communication device according to some embodiments.

FIG. 7 is a structural diagram of a communication device according to some embodiments of the present disclosure. The communication device can be implemented as the access network device or the terminal in the system shown in FIG. 1.

The communication device 700 includes an antenna 701, a processor 702 and a communication interface 705. The processor 702 can also be a controller and is represented as a "controller/processor 702" in FIG. 7. The antenna 701 is configured to support transceiving of information between the communication device and the terminal in the above examples. The processor 702 executes various functions for communicating with the terminal. On an uplink, an uplink signal from the terminal is received through the antenna 701, further processed by the processor 702, and sent to the central unit through the communication interface 705. On a downlink, protocol data that is received through the communication interface 705 and sent by the central unit is processed by the processor 702, and then transmitted to the terminal through the antenna 701.

Further, the communication device 700 can include a memory 703 for storing a program code and data of the communication device 700.

It can be understood that FIG. 7 only shows simplified design of the communication device 700. In practical application, the communication device 700 can include any number of transmitters, receivers, processors, controllers, memories, communication units and the like, and all communication devices that can implement the embodiments of the present disclosure are within the scope of protection of the examples of the present disclosure.

A person skilled in the art shall appreciate that in one or more examples described above, the functions described in the embodiments of the present disclosure can be implemented in hardware, software, firmware, or any combination thereof. If the functions are implemented in the software, they can be stored in a computer-readable medium or transmitted as one or more instructions or codes on a computer-readable medium, such as a non-transitory computer-readable storage medium.

The non-transitory computer-readable medium can include a computer storage medium and a communication medium, wherein the communication medium includes any medium that facilitates transfer of a computer program from one place to another, and the storage medium can be any available medium that can be accessed by a general-purpose or special-purpose computer.

Embodiments of the present disclosure further provide a computer storage medium which is used for storing a computer software instruction used by the above communication device and contains a program designed for executing method steps corresponding to the access network device or the terminal in FIG. 2 or FIG. 3.

The storage medium or memory can be implemented by any type of volatile or non-volatile storage devices or combinations thereof, such as a static anytime access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or a CD.

Various embodiments of the present disclosure can have one or more of the following advantages.

Because the terminal reports its latency indication information to the access network device, and the access network device manages communication resources of the terminal according to the latency indication information, the purpose of managing the communication resources of the terminal according to different processing latencies is achieved.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "connected," and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus or processing circuit on data stored on one or more computer-readable storage devices or received from other sources.

Processors suitable for the execution of a computer program such as the instructions described above include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

The processor or processing circuit can be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, general processors, or other electronic components, so as to perform the above image capturing method.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A communication resource management method, comprising:
   receiving latency indication information of a terminal, wherein the latency indication information is configured to indicate latency for processing a signal by the terminal; and
   managing communication resources of the terminal according to the latency indication information;
   wherein the latency indication information comprises:
   an upper limit value of a processing capability of the terminal or a lower limit value of the latency for processing the signal by the terminal, and
   a current processing capability value of the terminal, latency for currently processing the signal by the terminal or an offset between the latency for currently processing the signal by the terminal and the lower limit value of the latency for processing the signal by the terminal.

2. The method according to claim 1, wherein receiving latency indication information of a terminal from the terminal comprises:

receiving the latency indication information reported by the terminal through a radio resource control (RRC) message or through an uplink control signal.

3. The method according to claim 2, wherein the RRC message is a UE capability information message.

4. The method according to claim 2, wherein the uplink control signal is a control signal carried by a physical uplink control channel (PUCCH).

5. The method according to claim 1, wherein managing communication resources of the terminal according to the latency indication information comprises:
reserving communication resources for the terminal according to the latency indication information.

6. The method according to claim 5, wherein reserving communication resources for the terminal according to the latency indication information comprises:
reserving hybrid automatic repeat request (HARQ) resources for the terminal according to the latency indication information.

7. The method according to claim 6, wherein reserving HARQ resources for the terminal according to the latency indication information comprises:
reserving, according to the latency indication information, uplink resources for the terminal for feeding back an acknowledgement/non-acknowledgement message; and the number of the uplink resources is inversely proportional to the latency indicated by the latency indication information.

8. The method according to claim 1, wherein managing communication resources of the terminal according to the latency indication information comprises:
scheduling, according to the latency indication information, uplink and downlink transmission resources for the terminal.

9. The method according to claim 8, wherein managing communication resources of the terminal according to the latency indication information comprises:
managing the communication resources of the terminal according to multiple different processing latencies.

10. A communication resource management method, comprising:
acquiring latency indication information of a terminal, wherein the latency indication
information is configured to indicate latency for processing a signal by the terminal; and
transmitting the latency indication information to an access network device, so that the access network device manages communication resources of the terminal according to the latency indication information;
wherein the latency indication information comprises:
an upper limit value of a processing capability of the terminal or a lower limit value of the latency for processing the signal by the terminal, and
a current processing capability value of the terminal, latency for currently processing the signal by the terminal or an offset between the latency for currently processing the signal by the terminal and the lower limit value of the latency for processing the signal by the terminal.

11. The method according to claim 10, wherein transmitting the latency indication information to the access network device comprises:
transmitting the latency indication information to the access network device through a radio resource control (RRC) message or through an uplink control signal.

12. A communication resource management device, comprising: a processor; and memory for storing a processor-executable instruction, wherein the processor is configured to execute steps of a method comprising:
receiving latency indication information of a terminal from the terminal, wherein the latency indication information is configured to indicate latency for processing a signal by the terminal; and
managing communication resources of the terminal according to the latency indication information;
wherein the latency indication information comprises:
an upper limit value of a processing capability of the terminal or a lower limit value of the latency for processing the signal by the terminal, and
a current processing capability value of the terminal, latency for currently processing the signal by the terminal or an offset between the latency for currently processing the signal by the terminal and the lower limit value of the latency for processing the signal by the terminal.

13. The device according to claim 12, wherein receiving latency indication information of a terminal from the terminal comprises:
receiving the latency indication information reported by the terminal through a radio resource control (RRC) message or through an uplink control signal.

14. The device according to claim 13, wherein the RRC message is a UE capability information message.

15. The device according to claim 13, wherein the uplink control signal is a control signal carried by a physical uplink control channel (PUCCH).

16. The device according to claim 12, wherein managing the communication resources of the terminal according to the latency indication information comprises:
reserving, according to the latency indication information, uplink resources for the terminal for feeding back an acknowledgement/non-acknowledgement message; wherein the number of the uplink resources is inversely proportional to the latency indicated by the latency indication information.

17. The device according to claim 12, wherein managing the communication resources of the terminal according to the latency indication information comprises:
scheduling, according to the latency indication information, uplink and downlink transmission resources for the terminal.

18. The device according to claim 17, wherein managing communication resources of the terminal according to the latency indication information comprises:
managing the communication resources of the terminal according to multiple different processing latencies.

19. The device according to claim 12, wherein managing communication resources of the terminal according to the latency indication information comprises:
reserving communication resources for the terminal according to the latency indication information.

20. The device according to claim 19, wherein reserving communication resources for the terminal according to the latency indication information comprises:
reserving hybrid automatic repeat request (HARQ) resources for the terminal according to the latency indication information.

* * * * *